(12) United States Patent
Auch et al.

(10) Patent No.: US 8,632,137 B2
(45) Date of Patent: Jan. 21, 2014

(54) DEBRIS GUARD

(75) Inventors: Richard G. Auch, Peoria, IL (US);
Daniel P. Vertenten, Aurora, IL (US);
Michael P. Larson, Metamora, IL (US);
Daniel J. Marquette, Jr., Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 544 days.

(21) Appl. No.: 12/967,218

(22) Filed: Dec. 14, 2010

(65) Prior Publication Data

US 2011/0148188 A1 Jun. 23, 2011

Related U.S. Application Data

(60) Provisional application No. 61/288,780, filed on Dec. 21, 2009, provisional application No. 61/288,153, filed on Dec. 18, 2009.

(51) Int. Cl.
*B62D 55/088* (2006.01)
(52) U.S. Cl.
USPC ........................................ 305/100; 305/107
(58) Field of Classification Search
USPC .................. 305/100, 107, 110, 115; 172/508; 280/855, 856; 404/129
See application file for complete search history.

(56) References Cited

U.S. PATENT DOCUMENTS

| 2,518,481 | A | 8/1950 | Maguire |
| 3,912,336 | A | 10/1975 | Ritter, Jr. et al. |
| 3,913,985 | A | 10/1975 | Orr et al. |
| 4,239,297 | A | 12/1980 | Livesay |
| 4,640,559 | A | 2/1987 | Crotti |
| 5,951,123 | A | 9/1999 | Bomstad et al. |
| 5,967,242 | A | 10/1999 | Caron et al. |
| 6,076,843 | A | 6/2000 | Sewell |
| 6,322,170 | B1 | 11/2001 | Knell et al. |
| 6,371,578 | B1 * | 4/2002 | Ferguson .................. 305/107 |
| 7,556,323 | B1 | 7/2009 | Gachhadar et al. |
| 7,946,661 | B1 | 5/2011 | Freeman |
| 7,980,639 | B2 * | 7/2011 | Matthys .................... 305/109 |
| 2002/0140287 | A1 | 10/2002 | Fee et al. |

FOREIGN PATENT DOCUMENTS

| JP | 61-165885 | 10/1986 |
| JP | 06-051082 | 7/1994 |
| JP | 2008-201356 | 9/2008 |

OTHER PUBLICATIONS

International Search Report for PCT/US2010/060522 dated Aug. 25, 2011, 2 pages.

\* cited by examiner

*Primary Examiner* — Dennis Pedder
*Assistant Examiner* — Beverly Becker

(57) ABSTRACT

A debris guard includes a plurality of fasteners and an outer cover including two or more sections that when assembled form an annular inner wall. Each of the two or more sections includes at least one mounting feature shaped to receive at least one of the plurality of fasteners. An inner guard includes a mounting portion and a seal.

15 Claims, 6 Drawing Sheets

DEBRIS GUARD

RELATED APPLICATION

This application is based upon and claims the benefit of priority from U.S. Provisional Application No. 61/288,780 by Richard Geist Auch et al., filed Dec. 21, 2009, and from U.S. Provisional Application No. 61/288,153 by Richard Geist Auch et al., filed Dec. 18, 2009, the contents of which are expressly incorporated herein by reference.

TECHNICAL FIELD

This invention relates generally to a debris guard for an intersection between a portion of a machine rotatable relative to another portion of the machine.

BACKGROUND

Waste disposal sites provide some of the harshest environments in which machines operate because of the ingestion of material into an intersection between a part rotatable relative to another part of a machine. For example, wire, cables, and other debris can be pulled into the intersection between a hub of a final drive and a final drive housing of a track-type tractor and cause a metal-to-metal face seal to fail. Consequently, lubricant being retained by the metal-to-metal face seal can begin to leak which can further hasten wear and failure of the final drive components.

To prevent this failure, guards have been installed to protect these rotating intersections. For example, U.S. Pat. Nos. 6,231,136 and 6,293,631 to Freeman discloses a guard for the final drive of a track chain sprocket. While providing some protection, once debris passes through the grooves, the debris has direct access to the seal resulting in lubricant leakage. Other examples include U.S. Pat. Nos. 7,556,323, 6,371,578, 6,322,170, 6,076,843, 5,967,242, 5,951,123, 4,640,559, 4,239,297, 3,912,336, 2,518,481, and US Patent Application Publication No. 2002/0140287. Additionally, these guards may be difficult to remove and clean once installed and debris has been ingested into the crevices of the guards. The present invention is directed to overcome one or more of the problems as set forth above.

SUMMARY OF THE INVENTION

In one example of the present invention, a debris guard is provided. In one aspect, the debris guard includes a plurality of fasteners and an outer cover including two or more sections that when assembled form an annular inner wall. Each of the two or more sections includes at least one mounting feature shaped to receive at least one of the plurality of fasteners. An annular inner guard includes a mounting portion and one or more seals positioned remotely from the mounting portion. An annular secondary guard sized to engage the one or more seals. When assembled, the outer cover, inner guard, and secondary guard define a labyrinth including a narrow passage, a secondary narrow passage, and a chamber disposed between the narrow passage and the secondary narrow passage. The secondary narrow passage extends to the one or more seals.

In another aspect that may be combined with any of these aspects, the debris guard may be assembled on a machine such that the outer cover and secondary guard move together and are rotatable relative to the inner guard.

In another aspect that may be combined with any of these aspects, the inner guard includes an projection cooperating with the outer cover to form the narrow passage, the narrow passage having a first leg, a second leg extending perpendicular to the first leg, and a third leg extending parallel to the first leg and perpendicular to the second leg.

In another aspect that may be combined with any of these aspects, the debris guard has a central axis, the inner guard includes an outwardly-facing radial channel disposed adjacent the mounting portion.

In another aspect that may be combined with any of these aspects, the inner guard includes a removable annular seal retainer.

In another aspect that may be combined with any of these aspects, the mounting portion includes a plurality of bolt holes, wherein the inner guard further includes a body portion bolted to the mounting portion and a seal retainer bolted to the body portion, wherein the body portion cooperates with the mounting portion to form an outwardly-facing radial channel, wherein the body portion cooperates with the seal retainer to form an inwardly-facing seal retention groove.

In another aspect that may be combined with any of these aspects, a machine includes a first portion, a second portion rotatable about an axis of rotation relative to the first portion, and a debris guard. The debris guard includes an outer cover including two or more sections forming an inner annular wall, the outer cover removably attached to the first portion. An inner guard including a mounting portion and one or more seals with the mounting portion is attached to the second portion. A secondary guard is attached to the first portion with the secondary guard abutting the one or more seals.

In another aspect that may be combined with any of these aspects, the outer cover, inner guard, and secondary guard define a labyrinth including a narrow passage, a secondary narrow passage, and a chamber disposed between the narrow passage and the secondary narrow passage, wherein the secondary narrow passage extends to the one or more seals.

In another aspect that may be combined with any of these aspects, the outer cover and inner guard cooperate to define a radially oriented passage with respect to the axis.

In another aspect that may be combined with any of these aspects, the inner guard and the outer cover cooperate to form an annular opening. The inner guard includes an outwardly facing channel with respect to the axis, the channel being disposed axially between the seal and the annular opening.

In another aspect that may be combined with any of these aspects, a bottom surface of the channel extends parallel to the axis.

In another aspect that may be combined with any of these aspects, the first portion is a sprocket hub with the outer cover attached to the sprocket hub by a plurality of bolts extending through the sprocket hub to the outer cover.

In another aspect that may be combined with any of these aspects, the inner guard is positioned entirely beneath the outer cover and the secondary guard is disposed beneath the inner guard.

In another aspect that may be combined with any of these aspects, the inner guard includes an projection cooperating with the outer cover to form the narrow passage having a first leg, a second leg extending perpendicular to the first leg, and a third leg extending parallel to the first leg and perpendicular to the second leg.

In another aspect that may be combined with any of these aspects, the seal retainer includes a protrusion positioned to cooperate with a secondary guard to define the secondary narrow passage.

In another aspect that may be combined with any of these aspects, the labyrinth wraps around the inner guard at least one hundred eighty degrees.

DETAILED DESCRIPTION

Figure 1:
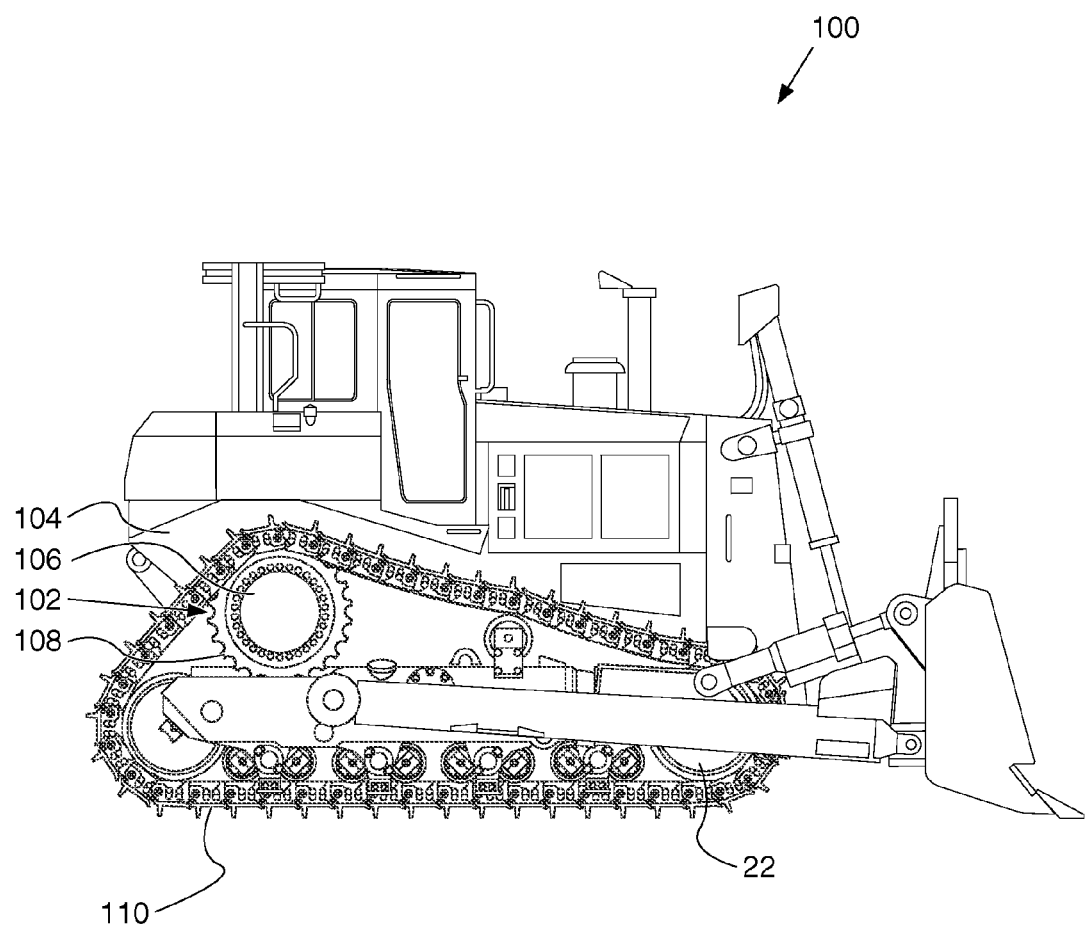
FIG. 1 is a side view of a machine.

Referring to FIG. 1, a side view illustrates a machine 100 that includes a first portion 102 and a second portion 104 rotatable relative to the first portion 102. More specifically, the first portion 102 and the second portion 104 may be components of a final drive 106 of a track-type tractor as shown. A sprocket 108 is attached to the final drive 106 and engages a track chain 110.

Alternatively, the machine 100 may be a track type loader, wheel loader, or other machine requiring protection for an intersection between components that are rotatable relative to each other. For example, the first portion 102 and the second portion 104 may be components of a drive train of a landfill compactor.

Figure 2:
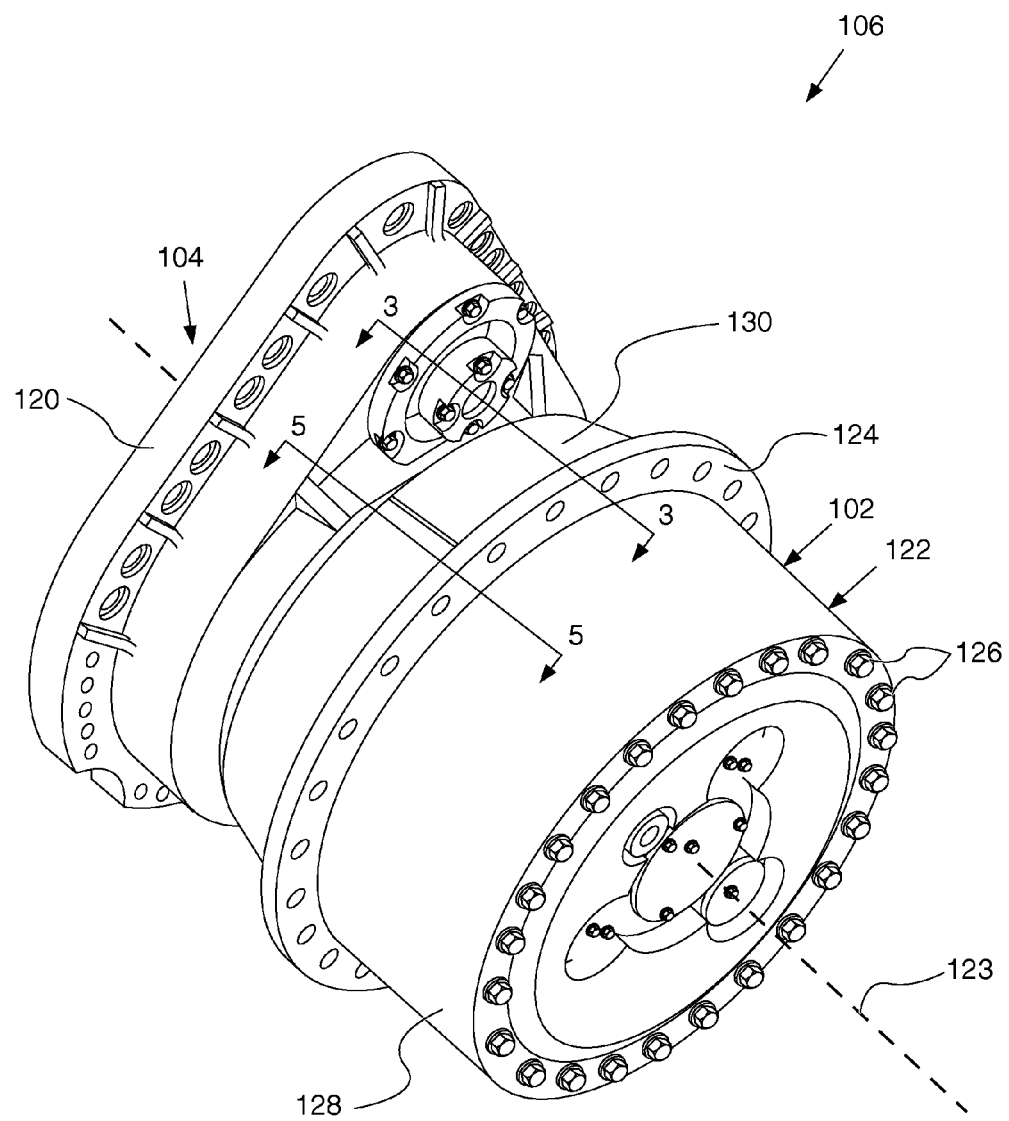
FIG. 2 is a perspective view of a final drive and an installed debris guard of the machine of FIG. 1.

Referring to FIG. 2, a perspective view illustrates a final drive 106 having a second portion 104 and a first portion 102 such as a final drive housing 120 and a hub 122. The hub 122 is rotatable with respect to the final drive housing 120 about an axis of rotation 123 and includes a sprocket mounting flange 124. Fasteners 126 attach a hub cover 128 to the hub 122. As used herein, the hub 122 includes the spindle and other moving components (not shown) of the final drive 106.

As shown, a debris guard 130 is installed over an intersection 132 (shown in FIG. 3) between the final drive housing 120 and a hub 122 or more generally, the first portion 102 and the second portion 104.

Figure 3:
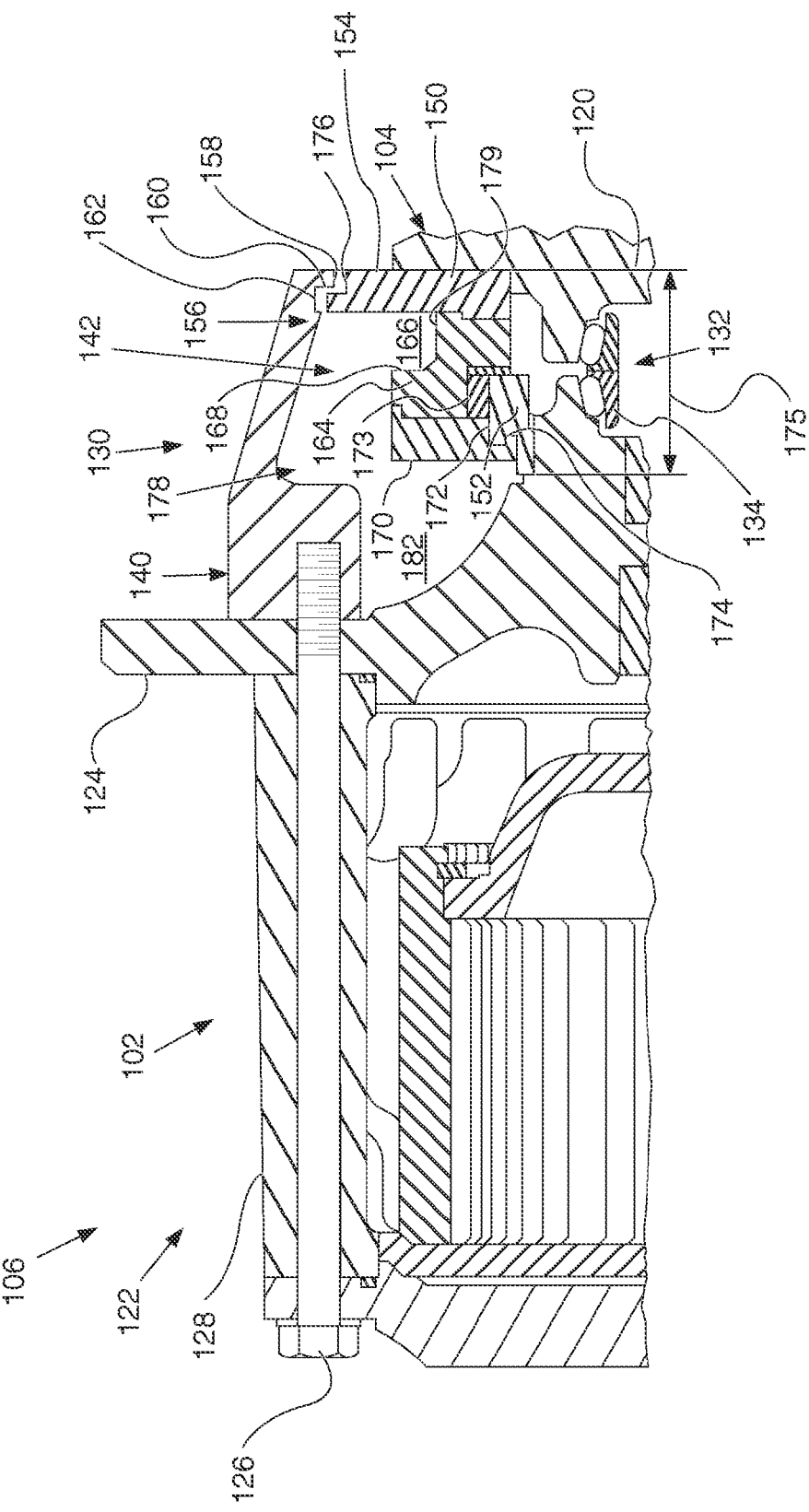
FIG. 3 is a cross section of the final drive and the debris guard along line 3-3 of FIG. 2.

Referring to FIG. 3, a cross section further illustrates the final drive 106 and the debris guard 130 along line 3-3 of FIG. 2. As shown, the intersection 132 between the final drive housing 120 and a hub 122 may be sealed by a final drive seal or machine seal 134 such as a metal-to-metal face to retain lubricant in the final drive 106. The machine seal 134 also prevents dirt and debris from entering the final drive 106 and accelerating wear of the final drive components.

To protect the machine seal 134 of the intersection 132, the debris guard 130 is installed over the intersection 132 between the final drive housing 120 and a hub 122, or more generally, the first portion 102 and the second portion 104. The debris guard 130 includes an outer cover 140 and an inner guard 142 that both span the intersection 132. As shown, the outer cover 140 is attached to the hub 122 by the fasteners 126 and more specifically bolts extending through the hub cover 128 and sprocket mounting flange 124 to the outer cover 140. Consequently, access and removal of the fasteners 126 is facilitated by avoiding the debris that can become attached to and over the outer cover 140.

The inner guard 142 may be entirely disposed under the outer cover 140 and includes a mounting portion 150 and one or more seals 173 positioned remotely from the mounting portion 150. In some configurations, the two seals 173 as shown may be unitarily formed as a single seal. Further, the one or more seals 173 may be rope seals. The mounting portion 150 is attached to the second portion 104. The mounting portion 150 may be attached by a press fit, weld, swage, or fasteners, such as bolts.

The inner guard 142 may also include projection 154 extending from the mounting portion and cooperating with the outer cover 140 to form a narrow passage 156. The narrow passage 156 inhibits the entry of debris between the inner guard 142 and outer cover 140. The narrow passage 156 includes a first leg 158, a second leg 160 extending perpendicular to the first leg 158, and a third leg 162 extending parallel to the first leg 158 and perpendicular to the second leg 160. As shown, the second leg 160 may be a radially oriented passage with respect to the axis of rotation 123 and the first and third legs 158, 162 may be oriented parallel to the axis of rotation 123.

The inner guard 142 may include a body portion 164 attached to the mounting portion 150. The body portion 164 may be attached to the mounting portion 150 by a press fit, weld, swage, or fasteners, such as bolts. Alternatively, the body portion 164 and the mounting portion 150 may be unitarily formed.

As shown, the body portion 164 and the mounting portion 150 may form an outwardly-facing radial channel 166 disposed adjacent the mounting portion 150. The channel 166 further inhibits entry of debris between the inner guard 142 and outer cover 140 by collecting the debris and a remote wall 168 acts as a barrier to further movement of the debris.

The inner guard 142 further includes a seal retainer 170 removably attached to the body portion 164. For example, the seal retainer 170 may be bolted to the body portion 164. The seal retainer 170 cooperates with body portion 164 to form an inwardly-facing seal retention groove 169. The seal retainer 170 also includes a protrusion 174 positioned to cooperate with a secondary guard 152 to define a secondary narrow passage 172 connecting the seal retention groove 169 with a chamber 182. The protrusion 174 provides a more winding and tortuous path to the seals 173 to prevent the ingestion of debris.

The secondary guard 152 may be welded, press fit, shrink fit, swaged, or fastened to the first portion 102.

The secondary guard 152 is affixed to the first portion 102 so that the secondary guard 152 rotates with the first portion 102 relative to the second portion 104. During cleaning and servicing of the debris guard 130, the one or more seals 173 may be replaced by separating the seal retainer 170 from the body portion 164, removing the old seals 173, installing new seals 173 in the seal retention groove 169, and refastening the seal retainer 170 to the body portion 164.

Assembled, the inner guard 142 has a length 175. When installed on the machine 100, the outer cover 140 and the secondary guard 152 rotate with the first portion 102 relative to the inner guard 142. Together, the inner guard 142 and the outer cover 140 cooperate to form an annular opening 176. Further, the inner guard 142, the outer cover 140, and the secondary guard 152 cooperate to form a labyrinth 178 that may extend along a path that extends over one hundred and eighty degrees to wrap around the inner guard 142 to the seals 173.

The labyrinth 178 includes the narrow passage 156 and the channel 166 that inhibit the passage of debris between the outer cover 140 and inner guard 142 from the annular opening 176 to the one or more seals 173. In addition, the channel 166 may be disposed between the one or more seals 173 and the annular opening 176 and a bottom surface 179 of the channel 166 may extend parallel to the axis of rotation 123 (shown in FIG. 2).

At a remote portion of the labyrinth 178 to the annular opening 176, the labyrinth 178 includes a chamber 182 bordering the secondary guard 152. The chamber 182 permits any ingested debris to collect during operation of the machine 100 until servicing of the debris guard 130. Because of the space provided by the chamber 182, debris packing may be inhibited. In other words, pressure of the debris on the seals 173 may be minimized until the chamber 182 is filled.

The labyrinth 178 further includes the secondary narrow passage 172 that inhibits debris moving to the seals 173. Thus, during operation of the machine 100, debris may be ingested, but is forced to move through the annular opening 176, the narrow passage 156, the channel 166, the chamber 182, and the secondary narrow passage 172 to reach the seals 173.

Figure 4:
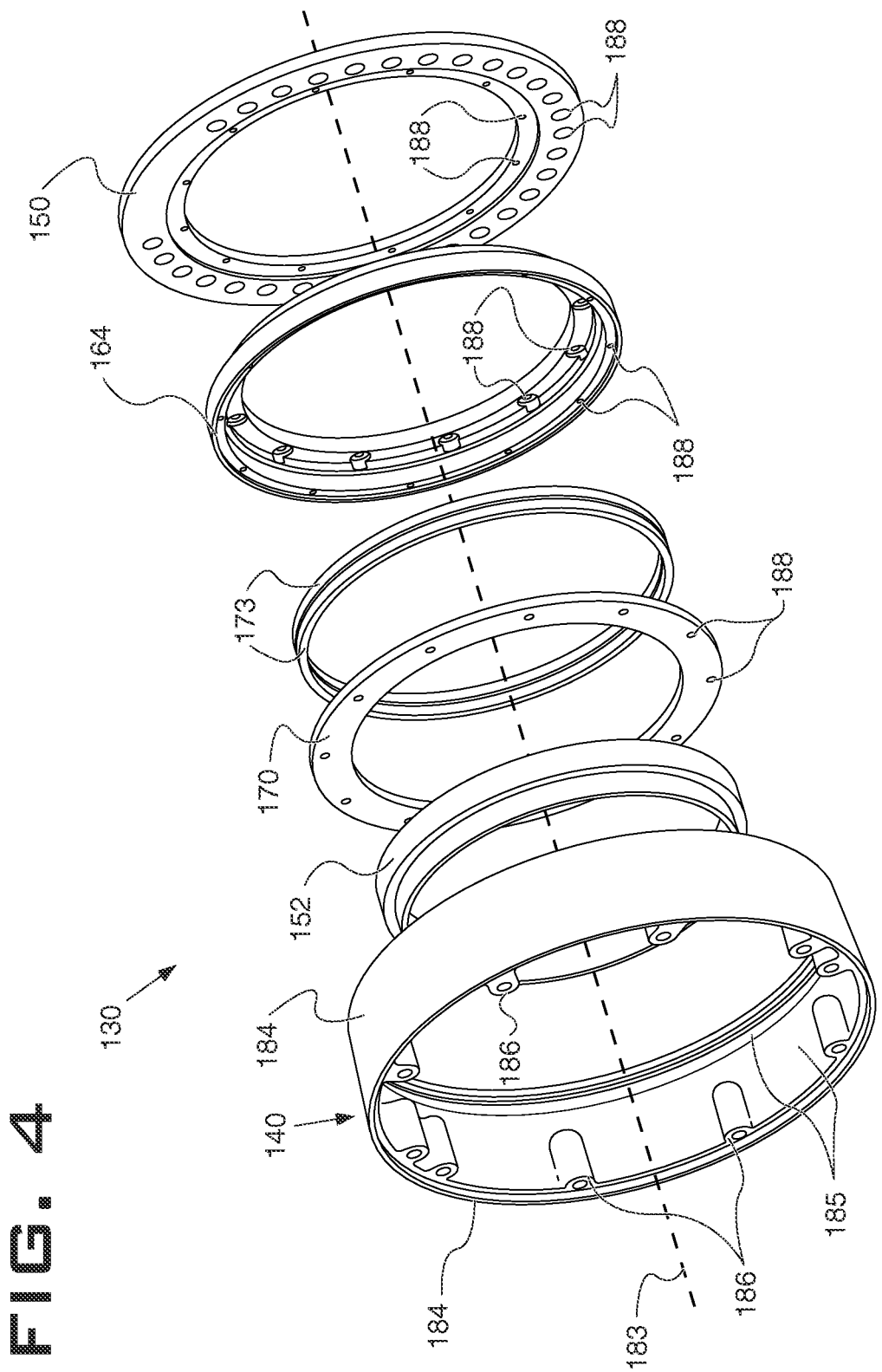
FIG. 4 is an exploded view of the debris guard of FIG. 3.

Referring to FIG. 4, an exploded view illustrates the components of the debris guard 130 of FIG. 3. As shown, the debris guard 130 has an axis 183 that when assembled on the machine 100 is coaxial with the axis of rotation 123 of the first portion 102 (shown in FIG. 2). The outer cover 140 includes two or more sections 184 that when assembled form an annular inner wall 185. Each of the two or more sections 184 includes at least one mounting feature 186 shaped to receive at least one of the plurality of fasteners 126 (shown in FIGS. 2 and 3).

As shown, the debris guard 130 further includes the secondary guard 152, the seal retainer 170, the one or more seals 173, the body portion 164, and the mounting portion 150. The secondary guard 152, the seal retainer 170, the seals 173, the body portion 164, and the mounting portion 150 have an annular shape.

Further, the seal retainer 170, the body portion 164, and the mounting portion 150 may each include a plurality of bolt holes 188 shaped to receive fasteners for separable attachment together and to the second portion 104. For example and in reference to FIG. 5, a cross section taken along line 5-5 of FIG. 2 illustrates a fastener 190 attaching the mounting portion 150 to the second portion 104.

Figure 5:
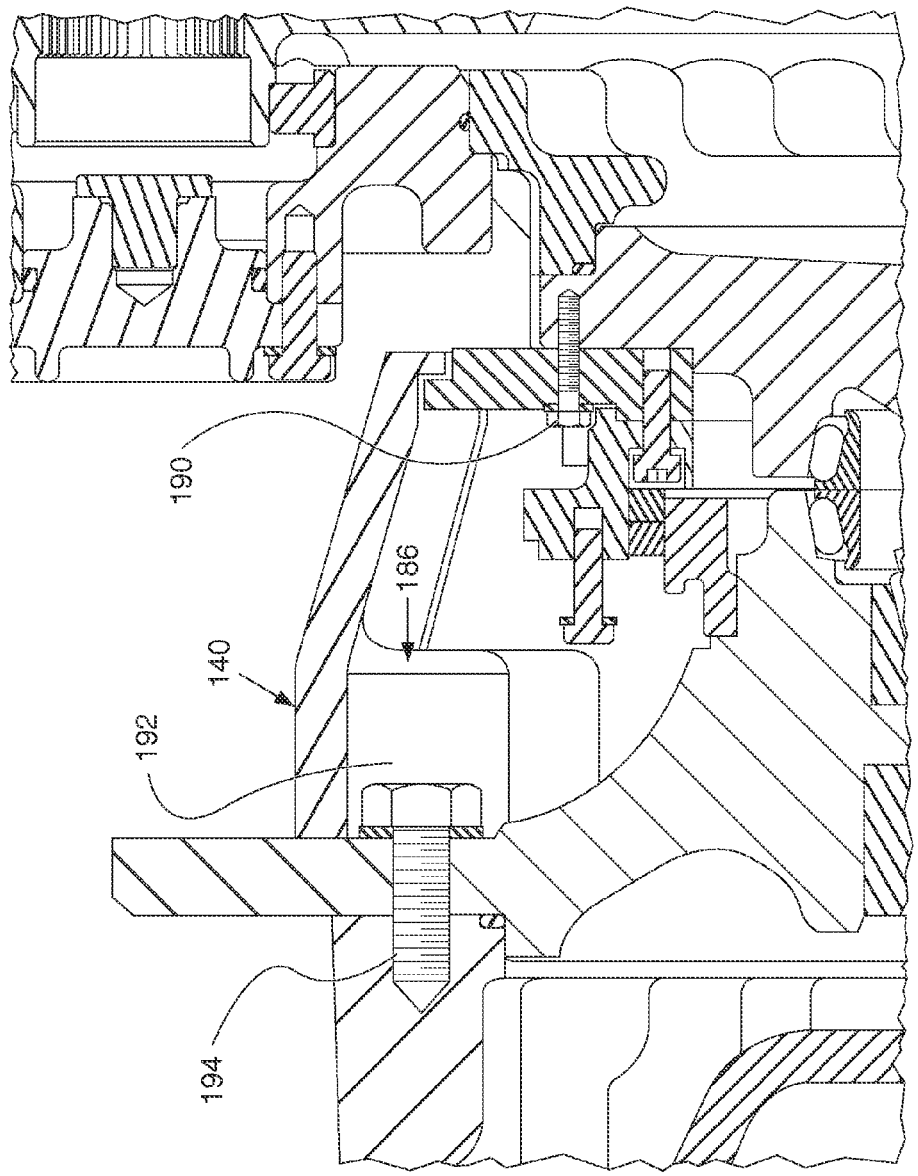
FIG. 5 is a cross section of the debris guard along line 5-5 of FIG. 2.

Referring to FIG. 5, another configuration of the mounting features 186 of the outer cover 140 is shown. Specifically, the mounting features 186 include a plurality of access channels 192 permitting a shorter fastener 194 to be used to attach the outer cover 140 to the first portion 102.

Figure 6:
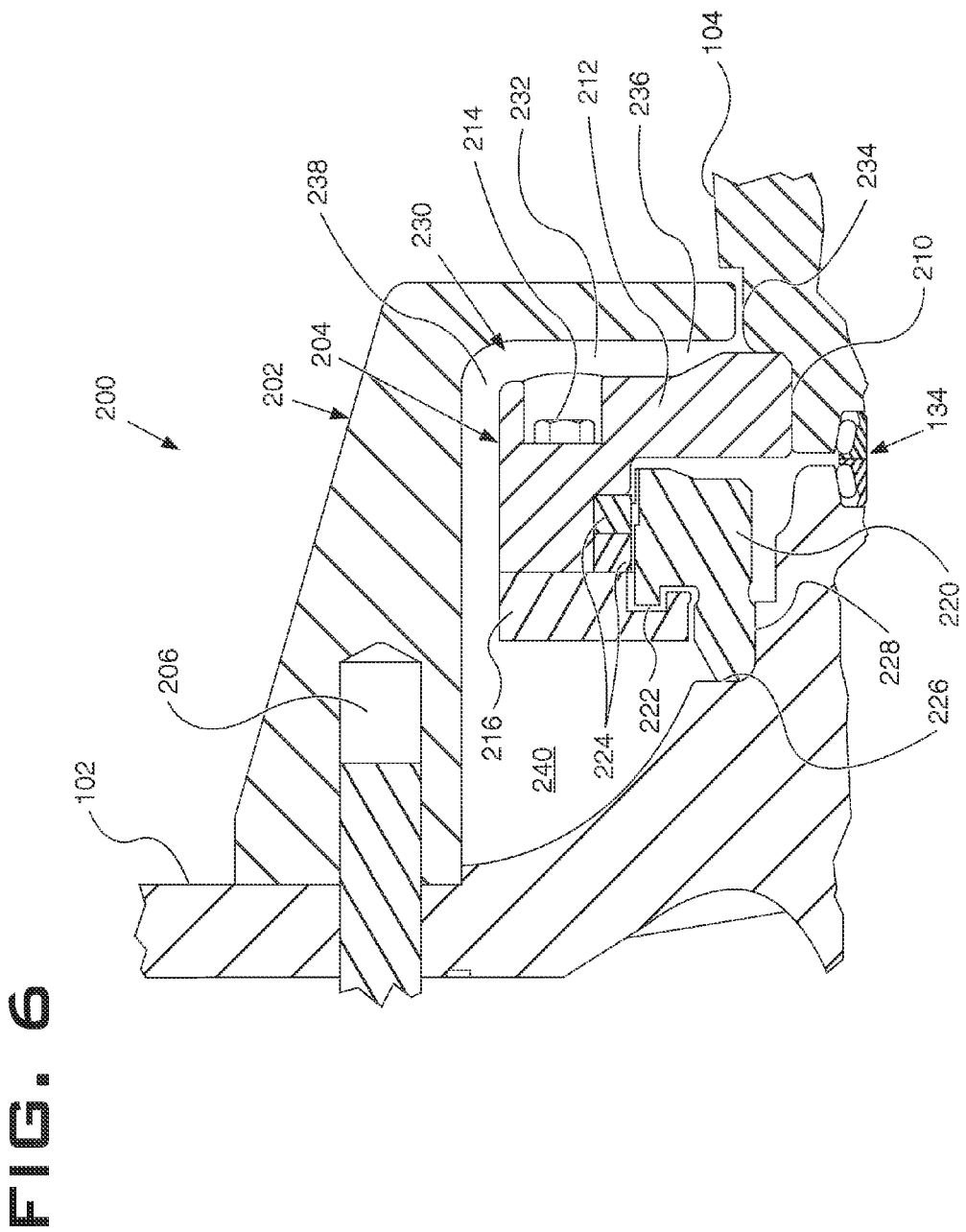
FIG. 6 is yet another cross section of an alternative configuration of the debris guard along line 3-3 of FIG. 2.

Referring to FIG. 6, is a cross section taken along line 3-3 of FIG. 2 illustrating an alternative configuration of the debris guard 200. As shown, the debris guard 200 includes an outer cover 202, an inner guard 204, and a secondary guard 220. The outer cover 202 includes mounting features 206 permitting removable attachment of the outer cover 202 to the first portion 102. Further, the outer cover 202 has an L-shaped cross section.

The inner guard 204 includes a mounting portion 210 and a body portion 212 that are unitarily formed. As shown in this configuration, the mounting portion 210 is welded to the second portion 104 and a fastener 214 attaches a seal retainer 216 to the body portion 212.

The inner guard 204 further includes one or more seals 224 disposed in a seal retention groove 221 formed by the seal retainer 216 and the body portion 212. As shown, the seals 224 are disposed by the inner guard 204 to engage and slide over the secondary guard 220. Further, the seal retainer 216 and the secondary guard 220 cooperate to define a secondary narrow passage 222.

As shown, the secondary guard 220 is affixed to the first portion 102 at an attachment feature 226 having a similar profile to an affixing surface 228 of the secondary guard 220.

Together, the outer cover 202 and the inner guard 204 cooperate to provide a labyrinth 230. The labyrinth 230 includes a narrow passage 232 having a first leg 234 oriented about parallel to the axis of rotation 123. A second leg 236 extends about perpendicularly to the first leg 234 and a third leg 238 extends about perpendicularly to the second leg 236 and about parallel to the first leg 234.

The labyrinth also includes a chamber 240 that connects to the narrow passage 232 with the secondary narrow passage 222. Similarly to the chamber 182 of the debris guard 130, the chamber 240 may minimize initial packing of debris against the seals 224 by providing space to accept entrained debris while minimizing packing pressure against the seals 224.

INDUSTRIAL APPLICABILITY

A debris guard according to the claimed invention may protect an intersection between a second portion and a first portion rotatable relative to the second portion and more particularly, may protect a seal positioned at the intersection. For example, a labyrinth of the debris guard includes a narrow annular passage to limit the entry of debris into the debris guard while providing clearance to permit the relative rotation between an outer cover and an inner guard of the debris guard. Additionally, the debris guard may facilitate removal of the out cover so that any ingested debris may be cleaned out and a seal of the debris guard replaced as needed. More importantly, the debris guards disclosed herein provide a tortuous labyrinth that includes a narrow passage, a chamber, and a secondary narrow passage that must be passed through to reach the seals of the debris guard before obtaining access to the seals of an intersection between a rotating portion of a machine and a non-rotating portion of the machine. Consequently, the seal of the intersection may be adequately protected over the life of the machine through maintenance of the debris guard.

What is claimed is:

1. A debris guard comprising:
a plurality of fasteners;
an outer cover including two or more sections that when assembled form an annular inner wall, each of the two or more sections including at least one mounting feature shaped to receive at least one of the plurality of fasteners;
an annular inner guard includes a mounting portion and one or more seals positioned remotely from the mounting portion; and
an annular secondary guard sized to engage the one or more seals;
wherein when assembled, the outer cover, inner guard, and secondary guard define a labyrinth including a narrow passage, a secondary narrow passage, and a chamber disposed between the narrow passage and the secondary narrow passage, wherein the secondary narrow passage extends to the one or more seals.

2. The debris guard of claim 1, wherein when the debris guard is assembled on a machine, the outer cover and secondary guard move together and are rotatable relative to the inner guard.

3. The debris guard of claim 1, wherein the inner guard includes an projection cooperating with the outer cover to form the narrow passage, the narrow passage having a first leg, a second leg extending perpendicular to the first leg, and a third leg extending parallel to the first leg and perpendicular to the second leg.

4. The debris guard of claim 1, wherein the debris guard has a central axis, the inner guard includes an outwardly-facing radial channel disposed adjacent the mounting portion.

5. The debris guard of claim 1, wherein the inner guard includes a removable annular seal retainer.

6. The debris guard of claim 1, wherein the mounting portion includes a plurality of bolt holes, wherein the inner guard further includes a body portion bolted to the mounting portion and a seal retainer bolted to the body portion, wherein the body portion cooperates with the mounting portion to form an outwardly-facing radial channel, wherein the body portion cooperates with the seal retainer to form an inwardly-facing seal retention groove.

7. A machine comprising:
a first portion;
a second portion rotatable about an axis of rotation relative to the first portion; and
a debris guard including;
an outer cover including two or more sections forming an inner annular wall, the outer cover removably attached to the first portion;
an inner guard including a mounting portion and one or more seals, wherein the mounting portion is attached to the second portion; and
a secondary guard attached to the first portion, the secondary guard abutting the one or more seals.

8. The machine of claim 7, wherein the outer cover, inner guard, and secondary guard define a labyrinth including a narrow passage, a secondary narrow passage, and a chamber disposed between the narrow passage and the secondary narrow passage, wherein the secondary narrow passage extends to the one or more seals.

9. The machine of claim 7, wherein the outer cover and inner guard cooperate to define a radially oriented passage with respect to the axis.

10. The machine of claim 7, wherein the inner guard and the outer cover cooperate to form an annular opening, wherein the inner guard includes an outwardly facing channel with respect to the axis, the channel being disposed axially between the seal and the annular opening.

11. The machine of claim 10, wherein a bottom surface of the channel extends parallel to the axis.

12. The machine of claim 7, wherein the first portion is a sprocket hub, wherein the outer cover is attached to the sprocket hub by a plurality of bolts extending through the sprocket hub to the outer cover.

13. The machine of claim 7, wherein the inner guard is positioned entirely beneath the outer cover and the secondary guard is disposed beneath the inner guard.

14. The machine of claim 7, wherein the inner guard includes an projection cooperating with the outer cover to form the narrow passage having a first leg, a second leg extending perpendicular to the first leg, and a third leg extending parallel to the first leg and perpendicular to the second leg.

15. The machine of claim 7, wherein the seal retainer includes a protrusion 174 positioned to cooperate with a secondary guard 152 to define the secondary narrow passage.

* * * * *